(12) United States Patent
Gulati et al.

(10) Patent No.: US 12,204,018 B2
(45) Date of Patent: Jan. 21, 2025

(54) TARGET DETECTION USING MULTIPLE RADAR WAVEFORMS

(71) Applicant: QUALCOMM Incorporated, San Diego, CA (US)

(72) Inventors: Kapil Gulati, Belle Mead, NJ (US); Junyi Li, Fairless Hills, PA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 17/446,247

(22) Filed: Aug. 27, 2021

(65) Prior Publication Data
US 2022/0075054 A1 Mar. 10, 2022

Related U.S. Application Data

(60) Provisional application No. 62/706,715, filed on Sep. 4, 2020.

(51) Int. Cl.
| | | |
|---|---|---|
| *G01S 13/87* | (2006.01) | |
| *G01S 13/76* | (2006.01) | |
| *H04W 64/00* | (2009.01) | |

(52) U.S. Cl.
CPC .......... *G01S 13/872* (2013.01); *G01S 13/765* (2013.01); *H04W 64/003* (2013.01)

(58) Field of Classification Search
CPC .......... G01S 2013/9316; G01S 13/931; G01S 13/003; G01S 13/878; G01S 13/872; G01S 13/765; G01S 13/325; G01S 13/87; H04W 4/40; H04W 4/029; H04W 4/38; H04W 64/00; H04W 64/003

USPC .............................. 342/58, 59, 43; 455/456.1
See application file for complete search history.

(56) References Cited

U.S. PATENT DOCUMENTS

| | | | | |
|---|---|---|---|---|
| 9,332,111 | B2 * | 5/2016 | Kim .................. | H04M 1/72412 |
| 9,357,560 | B2 * | 5/2016 | Lee .................. | H04W 36/0061 |
| 9,733,337 | B2 * | 8/2017 | Edge .................... | G01S 5/0236 |
| 9,866,993 | B2 * | 1/2018 | Das ........................ | H04W 4/02 |
| 10,008,817 | B2 * | 6/2018 | Fullerton ............. | H01R 31/065 |
| 10,379,201 | B2 * | 8/2019 | Villeval ................ | G01S 13/343 |
| 10,506,376 | B2 * | 12/2019 | Markhovsky ........... | G01S 5/011 |
| 10,567,905 | B2 * | 2/2020 | Edge ........................ | G01S 5/10 |
| 10,627,473 | B2 * | 4/2020 | Park ....................... | H04L 25/02 |
| 10,775,481 | B1 * | 9/2020 | Puglielli ............... | G01S 7/4091 |
| 10,779,126 | B2 * | 9/2020 | Kumar .................... | H04W 4/029 |
| 10,802,134 | B2 * | 10/2020 | Roger .................. | G01S 13/343 |
| 10,845,453 | B2 * | 11/2020 | Markhovsky .......... | G01S 13/765 |
| 10,966,209 | B2 * | 3/2021 | Edge ...................... | H04W 4/02 |
| 11,085,990 | B2 * | 8/2021 | Park ....................... | H04L 25/02 |
| 11,269,049 | B2 * | 3/2022 | Wu ........................ | G01S 13/42 |

(Continued)

*Primary Examiner* — Vladimir Magloire
*Assistant Examiner* — Michael W Justice
(74) *Attorney, Agent, or Firm* — Harrity & Harrity, LLP

(57) ABSTRACT

Various aspects of the present disclosure generally relate to wireless communication. In some aspects, a first user equipment (UE) may receive a reflection of a first radar waveform transmitted by the first UE. The UE may receive a second radar waveform from a second UE, wherein the second radar waveform is a direct transmission from the second UE or a reflection of the direct transmission. The UE may perform target detection based at least in part on the reflection of the first radar waveform and on the second radar waveform. Numerous other aspects are described.

30 Claims, 13 Drawing Sheets

(56) References Cited

U.S. PATENT DOCUMENTS

| | | | | |
|---|---|---|---|---|
| 11,317,415 B2* | 4/2022 | Khoryaev | | H04W 72/51 |
| 11,408,973 B2* | 8/2022 | Stauffer | | H04W 16/14 |
| 11,435,434 B2* | 9/2022 | Smith | | G01S 13/726 |
| 11,442,135 B2* | 9/2022 | Akkarakaran | | H04W 24/10 |
| 11,451,426 B2* | 9/2022 | Chae | | H04W 4/40 |
| 11,508,243 B2* | 11/2022 | Cheng | | G08G 1/161 |
| 11,520,030 B2* | 12/2022 | Wu | | G01S 13/325 |
| 11,539,795 B2* | 12/2022 | Cheng | | H04W 4/40 |
| 11,540,098 B2* | 12/2022 | Lee | | G01S 13/84 |
| 11,614,532 B2* | 3/2023 | Lovseth | | H04W 16/28 |
| | | | | 342/59 |
| 11,747,457 B2* | 9/2023 | Kahana | | G01S 13/931 |
| | | | | 342/118 |
| 11,765,669 B2* | 9/2023 | Nam | | H04B 7/0452 |
| | | | | 455/522 |
| 11,872,929 B2* | 1/2024 | Martin | | B60Q 1/08 |
| 2008/0170559 A1* | 7/2008 | Zumsteg | | H04J 3/0682 |
| | | | | 370/350 |
| 2013/0097525 A1* | 4/2013 | Kim | | G06F 3/0486 |
| | | | | 455/566 |
| 2013/0285848 A1* | 10/2013 | Grau Besoli | | H01Q 3/40 |
| | | | | 342/134 |
| 2015/0063321 A1* | 3/2015 | Sadek | | H04L 5/0062 |
| | | | | 370/336 |
| 2015/0156743 A1* | 6/2015 | Lee | | H04W 76/14 |
| | | | | 455/426.1 |
| 2015/0307091 A1* | 10/2015 | Gokan | | G01S 7/539 |
| | | | | 701/70 |
| 2016/0226207 A1* | 8/2016 | Fullerton | | H01R 13/6675 |
| 2016/0255463 A1* | 9/2016 | Das | | G01S 5/0236 |
| | | | | 455/456.1 |
| 2017/0059689 A1* | 3/2017 | Edge | | G01S 5/0289 |
| 2017/0227623 A1* | 8/2017 | Park | | G01S 3/46 |
| 2018/0088221 A1* | 3/2018 | Yomo | | G01S 7/003 |
| 2018/0113191 A1* | 4/2018 | Villeval | | G01S 7/0235 |
| 2018/0206109 A1* | 7/2018 | Bitra | | H04W 4/02 |
| 2018/0227714 A1* | 8/2018 | Lee | | H04L 67/12 |
| 2018/0284258 A1* | 10/2018 | Roger | | G01S 13/003 |
| 2018/0295470 A1* | 10/2018 | Markhovsky | | H04L 5/0048 |
| 2019/0124693 A1* | 4/2019 | Nguyen | | H04L 5/0044 |
| 2019/0166453 A1* | 5/2019 | Edge | | G01S 5/06 |
| 2019/0285722 A1* | 9/2019 | Markhovsky | | G01S 1/042 |
| 2019/0339373 A1* | 11/2019 | Kahana | | G01S 13/931 |
| 2019/0369201 A1* | 12/2019 | Akkarakaran | | G01S 5/10 |
| 2020/0021946 A1* | 1/2020 | Kumar | | G01S 1/0428 |
| 2020/0049808 A1* | 2/2020 | Bialer | | G01S 13/931 |
| 2020/0074402 A1* | 3/2020 | Adato | | G06V 20/52 |
| 2020/0084278 A1* | 3/2020 | Cheng | | H04W 4/44 |
| 2020/0107249 A1* | 4/2020 | Stauffer | | H04W 48/14 |
| 2020/0142033 A1* | 5/2020 | Shand | | G01S 7/4865 |
| 2020/0196298 A1* | 6/2020 | Edge | | G01S 5/12 |
| 2020/0275244 A1* | 8/2020 | Lee | | G01S 5/0284 |
| 2020/0300965 A1* | 9/2020 | Wu | | G01S 13/505 |
| 2020/0301002 A1* | 9/2020 | Wu | | G01S 7/41 |
| 2020/0365033 A1* | 11/2020 | Cheng | | G08G 1/096725 |
| 2020/0386844 A1* | 12/2020 | Park | | G01S 3/18 |
| 2021/0055373 A1* | 2/2021 | Smith | | G01S 7/003 |
| 2021/0088624 A1* | 3/2021 | Puglielli | | G01S 13/42 |
| 2021/0213873 A1* | 7/2021 | Martin | | H04W 4/46 |
| 2021/0223356 A1* | 7/2021 | Peng | | G01S 7/354 |
| 2021/0223381 A1* | 7/2021 | Lovseth | | H04W 4/029 |
| 2021/0266212 A1* | 8/2021 | Chae | | G01S 5/06 |
| 2022/0039080 A1* | 2/2022 | Khoryaev | | H04W 4/40 |
| 2022/0163651 A1* | 5/2022 | Bengtsson | | G01S 13/48 |
| 2022/0255643 A1* | 8/2022 | Zhao | | H04B 17/318 |
| 2022/0303917 A1* | 9/2022 | Nam | | H04W 52/367 |
| 2022/0361142 A1* | 11/2022 | Ko | | H04W 28/26 |

* cited by examiner

TARGET DETECTION USING MULTIPLE RADAR WAVEFORMS

CROSS-REFERENCE TO RELATED APPLICATION

This patent application claims priority to U.S. Provisional Patent Application No. 62/706,715, filed on Sep. 4, 2020, entitled "TARGET DETECTION USING MULTIPLE RADAR WAVEFORMS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for target detection using multiple radar waveforms.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes receiving a reflection of a first radar waveform transmitted by the first UE; receiving a second radar waveform from a second UE, wherein the second radar waveform is a direct transmission from the second UE or a reflection of the direct transmission; and performing target detection based at least in part on the reflection of the first radar waveform and the second radar waveform.

In some aspects, a first UE for wireless communication includes a memory and one or more processors, coupled to the memory, configured to: receive a reflection of a first radar waveform transmitted by the first UE; receive a second radar waveform from a second UE, wherein the second radar waveform is a direct transmission from the second UE or a reflection of the direct transmission; and perform target detection based at least in part on the reflection of the first radar waveform and the second radar waveform.

In some aspects, a non-transitory computer-readable medium storing a set of instructions for wireless communication includes one or more instructions that, when executed by one or more processors of a first UE, cause the first UE to: receive a reflection of a first radar waveform transmitted by the first UE; receive a second radar waveform from a second UE, wherein the second radar waveform is a direct transmission from the second UE or a reflection of the direct transmission; and perform target detection based at least in part on the reflection of the first radar waveform and the second radar waveform.

In some aspects, a first apparatus for wireless communication includes means for receiving a reflection of a first radar waveform transmitted by the first apparatus; means for receiving a second radar waveform from a second apparatus, wherein the second radar waveform is a direct transmission from the second apparatus or a reflection of the direct transmission; and means for performing target detection based at least in part on the reflection of the first radar waveform and the second radar waveform.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
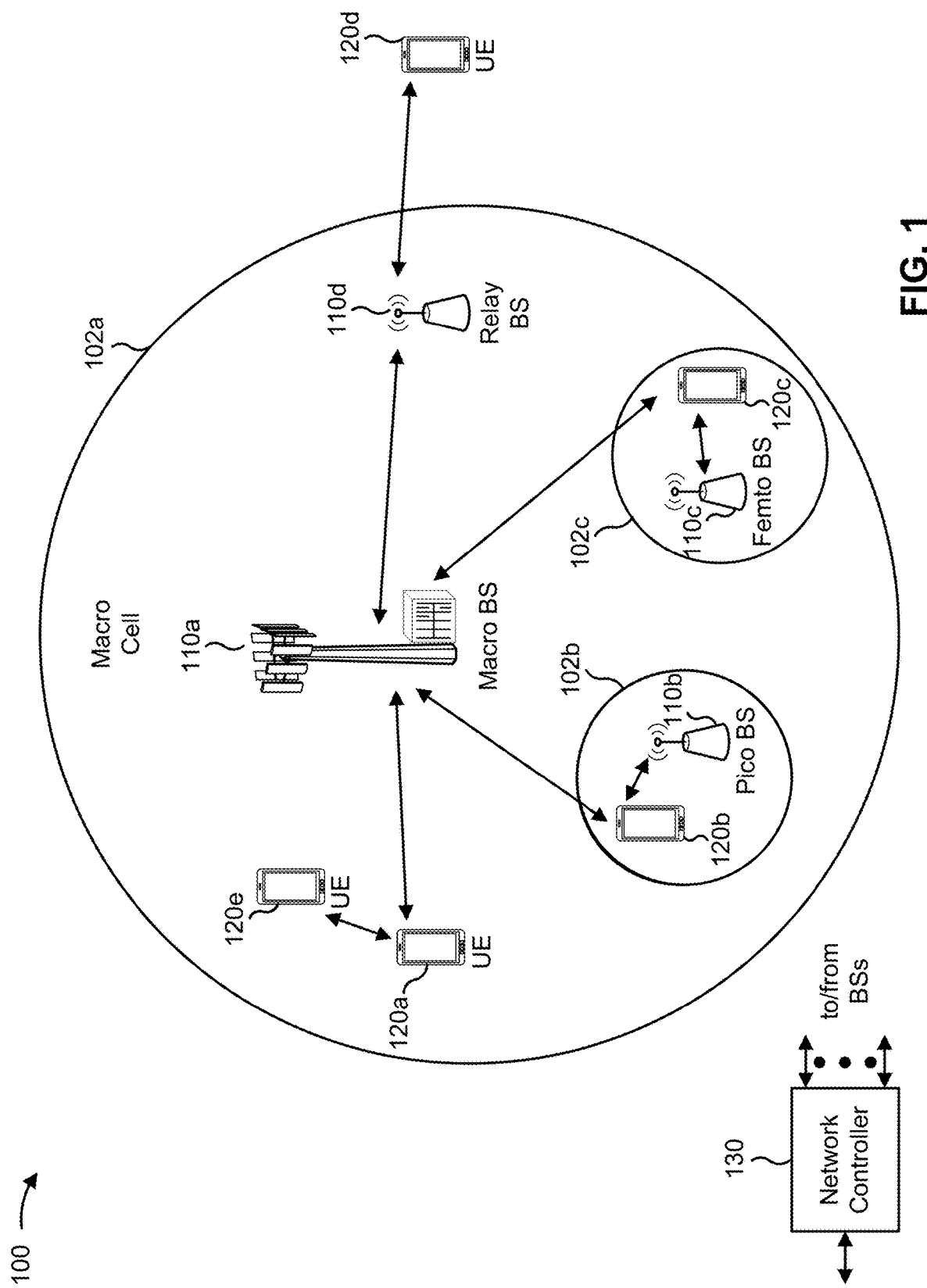
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
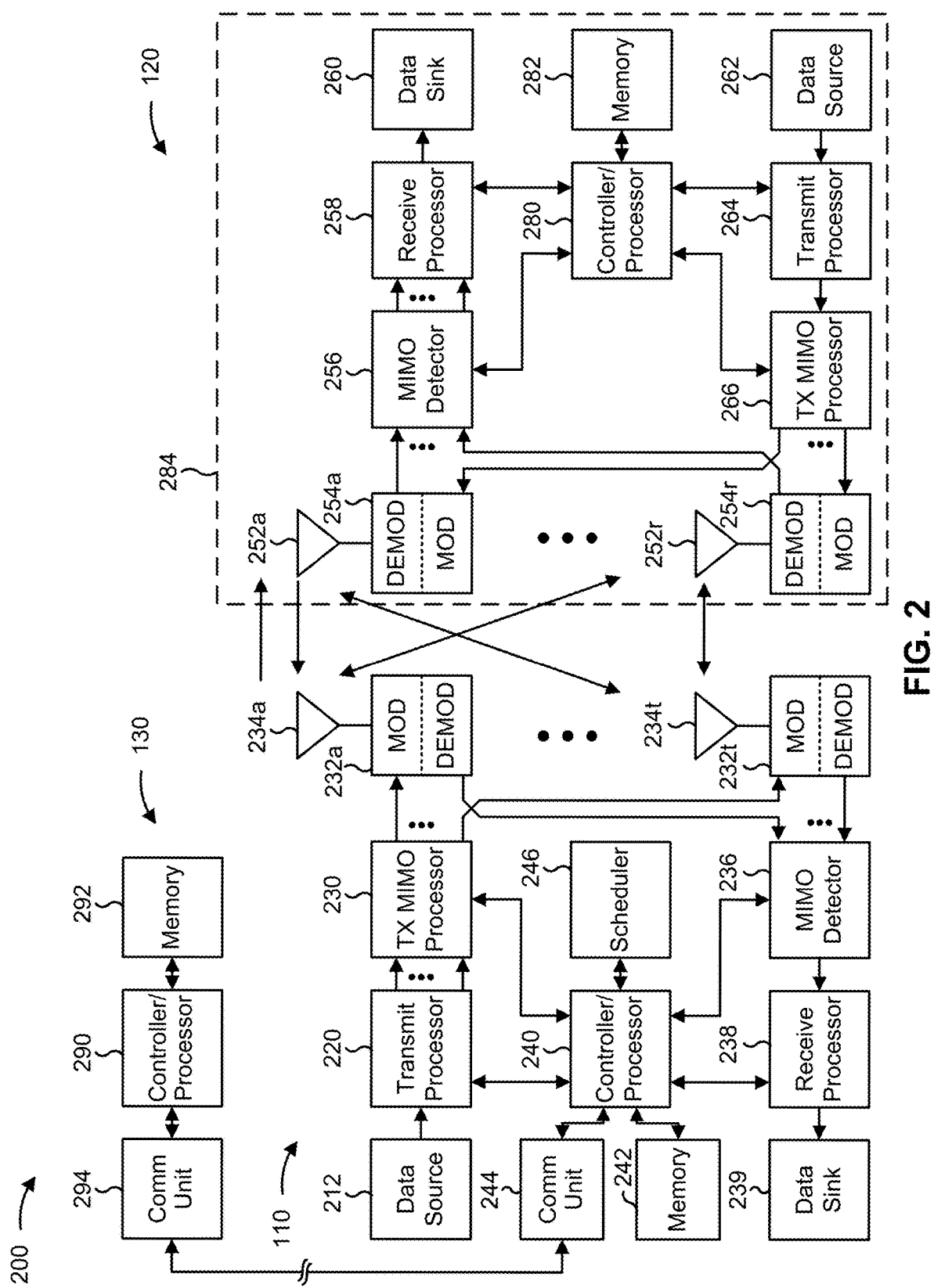
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-13).

The controller/processor 240 of the base station 110, the controller/processor 280 of the UE 120, and/or any other component(s) of FIG. 2 may perform one or more techniques associated with target detection using multiple radar waveforms as described in more detail elsewhere herein. For example, the controller/processor 240 of the base station 110, the controller/processor 280 of the UE 120, and/or any other component(s) of FIG. 2 may perform or direct operations of, for example, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) may include means for receiving a reflection of a first radar waveform transmitted by the first UE, means for receiving a second radar waveform from a second UE, wherein the second radar waveform is a direct transmission from the second UE or a reflection of the direct transmission, and/or means for performing target detection based at least in part on the reflection of the first radar waveform and the second radar waveform. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
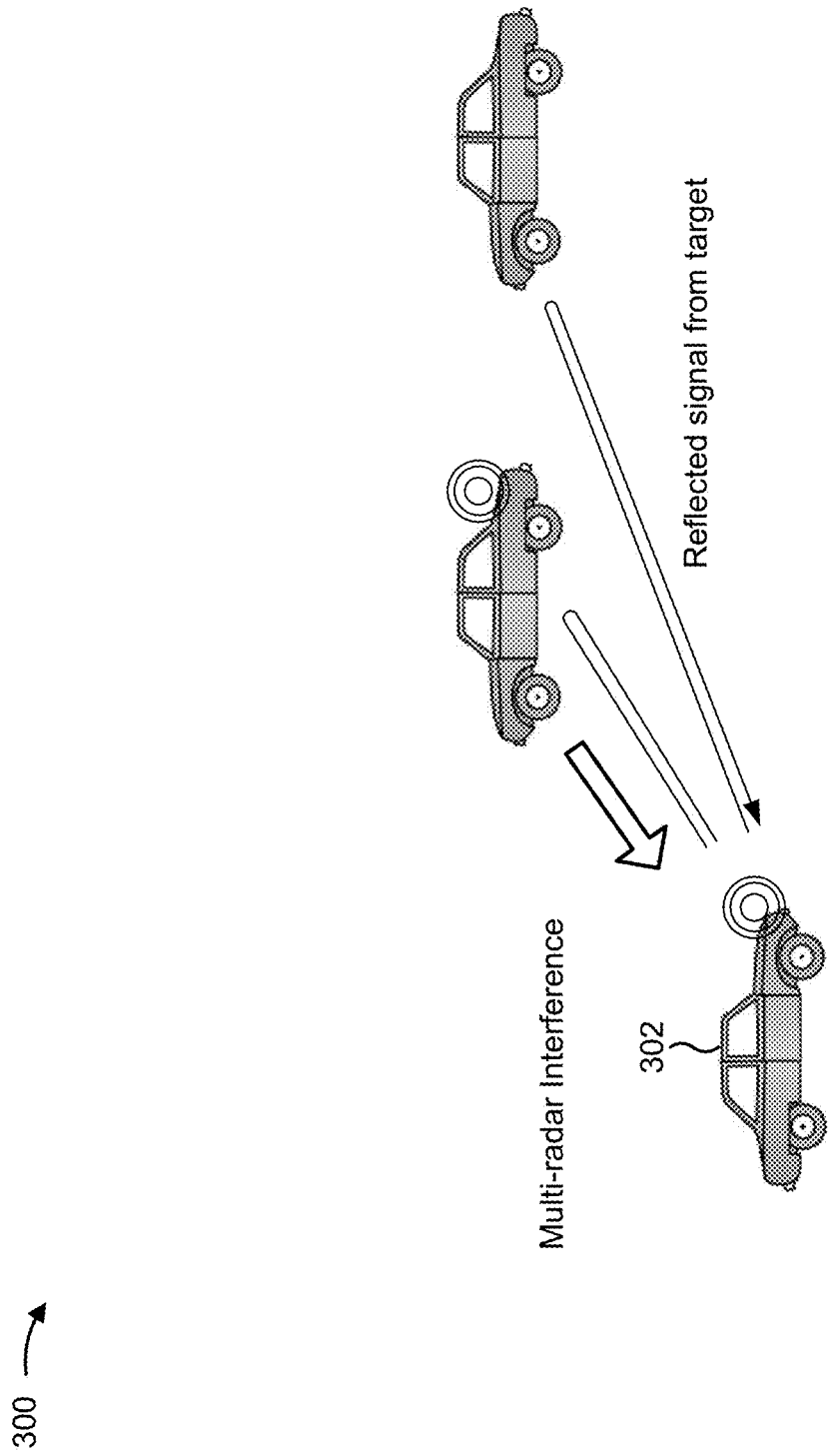
FIG. 3 is a diagram illustrating an example of multi-radar interference, in accordance with the present disclosure.

FIG. 3 is a diagram illustrating an example 300 of multi-radar interference, in accordance with the present disclosure.

Multiple radar sources may lead to interference. Conventional radar waveforms, such as frequency-modulated continuous wave (FMCW) waveforms, may be indistinguishable from various source(s). Interfering radar sources may appear as ghost target(s) to an ego-radar. As used herein, an "ego-radar" may refer to a radar source of a UE (or vehicle) that is subjected to interference. A ghost target may be at a half-distance plus a time offset from the ego-radar, and may be associated with an increased power. The interference sources may increase a noise floor at the ego-radar, depending on radar waveforms used by the ego-radar and the interfering radar sources. Interference at the ego-radar from a direct interference path may be stronger than interference from a reflected path.

As shown in FIG. 3, a UE 302 (e.g., a vehicle) may experience interference from other UEs (e.g., two other vehicles). The interference may be due to direct interference paths and/or reflected paths caused by the other UEs. In this example, the UE 302 may be associated with an ego-radar, and the other UEs may be associated with interfering radar sources.

As indicated above, FIG. 3 is provided as an example. Other examples may differ from what is described with regard to FIG. 3.

Figure 4:
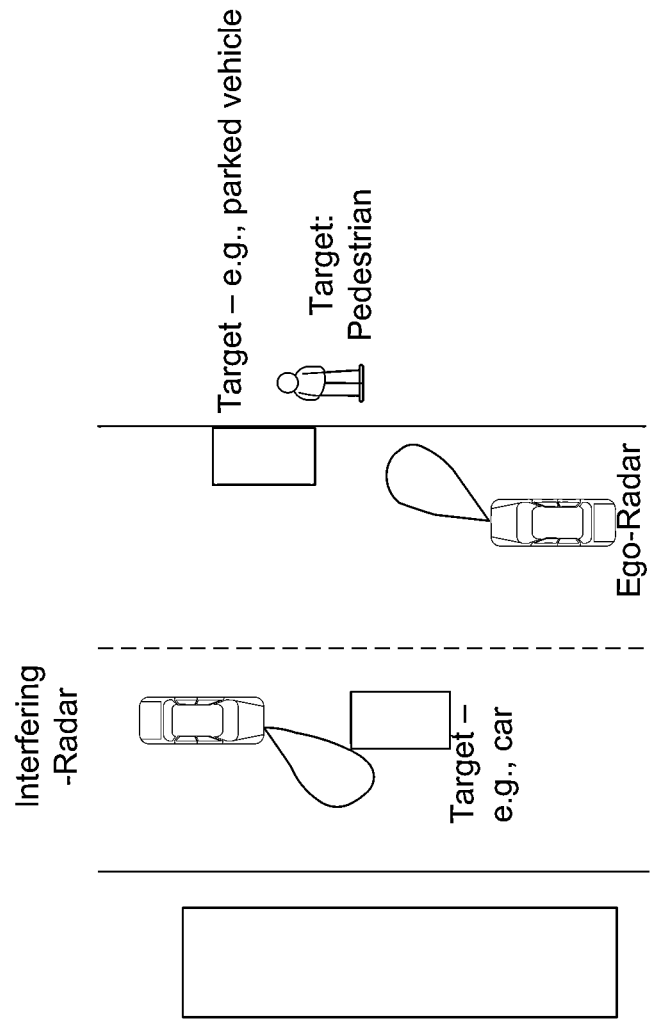
FIG. 4 is a diagram illustrating an example of mutual radar-interference avoidance, in accordance with the present disclosure.

FIG. 4 is a diagram illustrating an example 400 of mutual radar-interference avoidance, in accordance with the present disclosure.

As shown in FIG. 4, an ego-radar associated with a first vehicle (or first UE) may be surrounded by multiple targets (e.g., parked vehicles, moving vehicles, and/or pedestrians). The ego-radar may be in proximity to an interfering radar source associated with a second vehicle (or second UE). In this example, mutual radar-interference avoidance may be achieved by using transmit beamformed radar transmissions. For example, the ego-radar and the interfering radar source may use different transmit beam directions to achieve mutual radar-interference avoidance.

Multi-radar interference may be treated as noise, and various mitigation techniques may be employed to avoid and/or suppress the interference. In some cases, radar waveform parameters may be selected to avoid the interference. The radar waveform parameters may be selected to be different among various radar sources. The radar waveform parameters may be static or hopping in time to avoid consistent collisions across various radar sources. The radar waveform parameters may include a carrier frequency and/or band over which a radar waveform is transmitted, an indication of whether a radar transmission is a time division multiplexing (TDM) radar transmission, a transmit beam direction, a polarization, and/or waveform parameters. The radar waveform parameters may include, as an example, for a radar using an FMCW waveform, a selected chirp slot and a selected time offset such that a beat-frequency may be beyond a maximum detection range of the radar and may be filtered out at an ego-radar. In some cases, interference may be suppressed by changing radar waveform parameters, such that the interference may be spread over an entire delay-Doppler-direction of arrival (DoA) spectrum at the ego-radar. As a result, the interference may be presented as white noise at a receiver associated with the ego-radar.

As indicated above, FIG. 4 is provided as an example. Other examples may differ from what is described with regard to FIG. 4.

Multi-radar transmissions may provide additional radio frequency (RF) illumination of an environment, and the multi-radar transmissions may improve target direction. However, an ego-radar associated with a first vehicle may be unable to use radar transmissions from a second radar source associated with a second vehicle for target detection, as the ego-radar may be unable to detect the radar transmissions from the second radar source. The ego-radar may not have information on radar waveform parameters used for the radar transmissions from the second radar source, which may cause the radar transmissions from the second radar source to be undetectable and/or unusable at the ego-radar. As a result, the first vehicle may be limited to performing target detection using reflections from the ego-radar of the first vehicle, and may be unable to perform target detection using radar transmissions from the second radar source of the second vehicle, which would improve target detection.

In various aspects of techniques and apparatuses described herein, an ego-radar associated with a first vehicle (or first UE) may be configured to perform cooperative radar sensing for target detection. The ego-radar may perform target detection based at least in part on reflections of ego-radar signal transmissions, as well as direct and reflected paths of radar transmissions by other radar sources associated with other vehicles. In other words, radar transmissions from the other radar sources (e.g., radar sources other than an ego-radar) may provide additional RF illumination on the environment being sensed by the ego-radar, and the radar transmissions from the other radar sources may be used to improve target detection at the ego-radar. The other radar sources may be targets to the ego-radar, and the other radar sources may be other non-co-located radar sources. The direct and reflected paths of the radar transmissions by the other radar sources may be detected at the ego-radar based at least in part on previously received information (e.g., radar waveform parameters) associated with the radar transmissions performed by the other radar sources. The previously received information may enable the ego-radar to perform a coherent/matched detection of the radar transmissions from the other radar sources.

In various aspects of techniques and apparatuses described herein, multiple radar sources may be used for target detection, which may result in an increased point-cloud corresponding to a target. The ego-radar may gain different perspectives of the target because the ego-radar may use the direct and reflected paths of the radar transmissions by the other radar sources, where the other radar sources may be at different locations relative to the ego-radar.

For example, the ego-radar may detect one perspective of a pedestrian using reflections of ego-radar transmissions, but may also detect and associate reflections from a second vehicle (or second UE) approaching the pedestrian from another direction. In this example, the ego-radar may gain reflections from a different perspective associated with the second vehicle, which may increase a density of the point-cloud associated with the pedestrian and may result in improved target classification (e.g., as a pedestrian).

Figure 5:
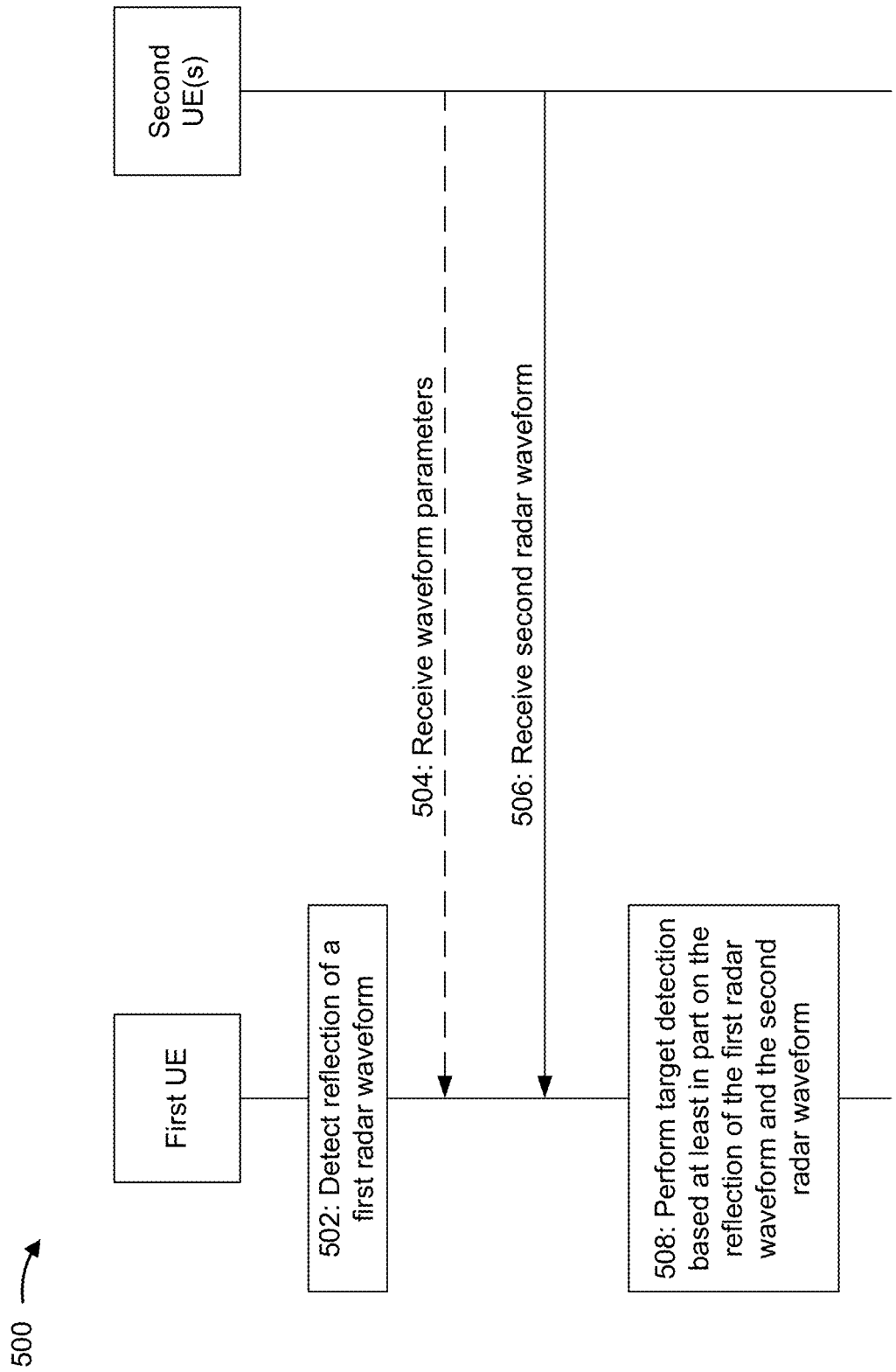
FIGS. 5-11 are diagrams illustrating examples associated with target detection using multiple radar waveforms, in accordance with the present disclosure.

FIG. 5 is a diagram illustrating an example 500 associated with target detection using multiple radar waveforms, in accordance with the present disclosure. As shown in FIG. 5, example 500 includes communication between a first UE (e.g., UE 120a) and a second UE (e.g., UE 120e). In some aspects, the first UE and the second UE may be included in a wireless network such as wireless network 100. The first UE and the second UE may communicate on a wireless sidelink.

In some aspects, the first UE may be associated with a first vehicle, and the second UE may be associated with a second vehicle.

As shown by reference number 502, the first UE may detect a reflection of a first radar waveform transmitted by the first UE. For example, the first UE may transmit the first radar waveform, and the first UE may receive the reflection of the first radar waveform.

As shown by reference number 504, the first UE may receive radar waveform parameters from the second UE. The radar waveform parameters may be applied by the second UE when transmitting radar waveforms from the second UE. The radar waveform parameters may be received at the first UE via a sidelink interface between the first UE and the second UE.

As shown by reference number 506, the first UE may receive a second radar waveform from the second UE. The second radar waveform may be a direct transmission from the second UE or a reflection of the direct transmission. In some aspects, the first UE may receive the second radar waveform via a matched reception based at least in part on the radar waveform parameters.

In some aspects, the first UE may identify the radar waveform parameters applied at the second UE. For example, the first UE may adjust candidate radar waveform parameters to arrive at the radar waveform parameters. The first UE may arrive at the radar waveform parameters applied at the second UE when the second radar waveform transmitted by the second UE is detected at the first UE. In some aspects, the first radar waveform may not be transmitted while the candidate radar waveform parameters are being adjusted to detect the second radar waveform.

In some aspects, the first radar waveform may not be transmitted for a duration of time, and the first UE may attempt to receive the second radar waveform by varying radar waveform parameters until the first UE is able to perform a matched reception of the second radar waveform (e.g., until a direct path and reflections appear as distinct targets on a radar image). The first UE may mute the first radar waveform for the duration of time and tune a front-end until radar waveform parameters match radar waveform parameters of the second radar waveform, thereby generating distinct targets due to a coherent/matched reception of the second radar waveform.

In some aspects, the first UE may adjust radar waveform parameters associated with the first radar waveform to arrive at the radar waveform parameters used by the second UE. The first UE may arrive at the radar waveform parameters applied at the second UE when the second radar waveform transmitted by the second UE is detected at the first UE. The radar waveform parameters associated with the first radar waveform may be adjusted to receive the first radar waveform and the second radar waveform.

In some aspects, the first UE may modify radar waveform parameters corresponding to the first radar waveform in order to coherently receive the first radar waveform and the second radar waveform. In other words, the radar waveform parameters corresponding to the first radar waveform may be modified over multiple frames. The UE may identify potential radar waveform parameters being used by the second UE based at least in part on detected targets on a radar image.

In some aspects, the first radar waveform may be associated with a first waveform signature and the second radar waveform may be associated with a second waveform signature. The first waveform signature may be associated with a first code, a first time offset, a first phase code, or a combination thereof. The second waveform signature may be associated with a second code, a second time offset, a second phase code, or a combination thereof.

As shown by reference number 508, the first UE may perform target detection based at least in part on the reflection of the first radar waveform and on the second radar waveform. The first UE may detect a first set of targets based at least in part on the reflection of the first radar waveform transmitted by the first UE. The first UE may detect a second set of targets based at least in part on the second radar waveform received from the second UE. The second set of targets may be detected based at least in part on the direct transmission of the second radar waveform from the second UE or the reflection of the second radar waveform. The first UE may associate a member of the second set of targets with a member of the first set of targets based at least in part on a location associated with the member of the second set of targets. The member of the second set of targets may be associated with the member of the first set of targets to form a detected target. In some aspects, the first set of targets may be distinguished from the second set of targets based at least in part on the first waveform signature associated with the first radar waveform and the second waveform signature associated with the second radar waveform.

In some aspects, the first UE may randomize one or more radar waveform parameters associated with the first radar waveform to distinguish between targets (e.g., the first set of targets and the second set of targets). The targets may include real targets based at least in part on reflections from the first radar waveform and/or targets generated due to direct and/or reflections of the second radar waveform. The first UE may perform target detection in a first radar frame based at least in part on a set of radar waveform parameters for the first radar waveform. The first UE may perform target detection in a second radar frame based at least in part on a set of radar waveform parameters for the first radar waveform. In both cases, the set of radar waveform parameters for the first radar waveform may be randomized.

The first UE may identify a target associated with the first set of targets when a location of the target does not change between the two radar frames, or when a change tolerance is within an expected mobility of the target. The first UE may identify a target associated with the second set of targets when a location of the target changes between the two frames. The change may be beyond an expected mobility of the target. In some cases, the target may be absent or not detected in the two frames. Targets generated by the first UE may be based at least in part on matched reception, while targets generated due to the second radar waveform may hop and/or disappear/reappear due to a random mismatch between radar waveform parameters associated with the second radar waveform and radar waveform parameters associated with the first radar waveform.

As indicated above, FIG. 5 is provided as an example. Other examples may differ from what is described with regard to FIG. 5.

Figure 6:
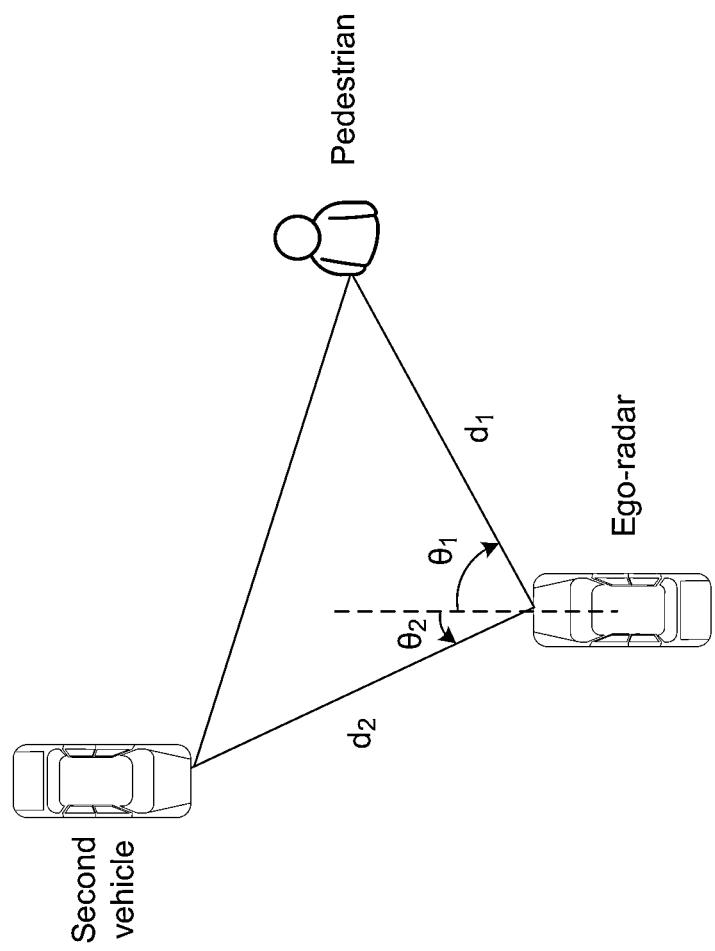

FIG. 6 is a diagram illustrating an example 600 associated with target detection using multiple radar waveforms, in accordance with the present disclosure.

As shown in FIG. 6, an ego-radar associated with a first vehicle (or first UE) may be in proximity to two targets. A first target may be a second vehicle (or second UE). A second target may be a pedestrian. A distance between the ego-radar and the first target may be represented by $d_2$, and an angle between the ego-radar and the first target may be represented by $\theta_2$. A distance between the ego-radar and the second target may be represented by $d_1$, and an angle between the ego-radar and the second target may be represented by $\theta_1$.

As indicated above, FIG. 6 is provided as an example. Other examples may differ from what is described with regard to FIG. 6.

Figure 7:
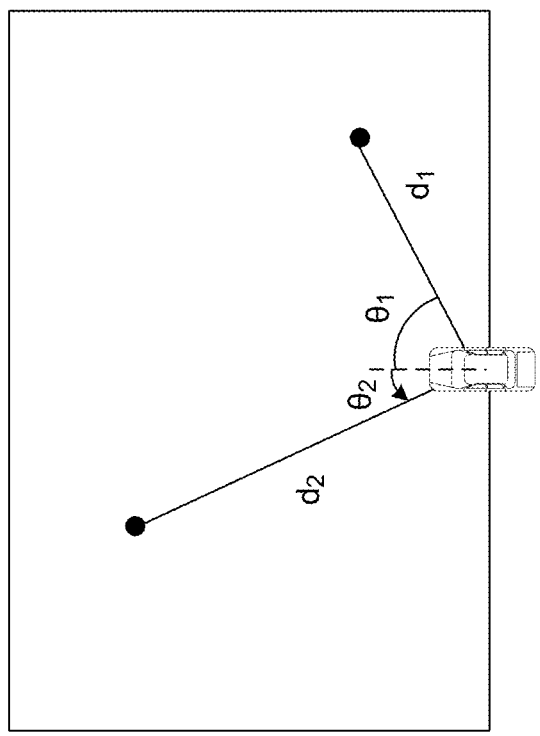

FIG. 7 is a diagram illustrating an example 700 associated with target detection using multiple radar waveforms, in accordance with the present disclosure.

As shown in FIG. 7, an ego-radar associated with a first vehicle (or first UE) may be in proximity to two targets (represented by the solid circles). The two targets may include a first target corresponding to a second vehicle (or second UE) and a second target corresponding to a pedestrian (as shown in FIG. 6). With no multi-radar transmissions and/or interference, the ego-radar may detect the two targets based at least in part on reflections of ego-radar signal transmissions. If one or both of the two targets also perform radar transmissions, the ego-radar may treat the other radar transmissions as interference and/or noise and suppress the other radar transmissions. When the other radar transmissions are suppressed, target detection for the two targets may weaken. The suppression of the other radar transmissions may also lead to random false detection.

As indicated above, FIG. 7 is provided as an example. Other examples may differ from what is described with regard to FIG. 7.

Figure 8:
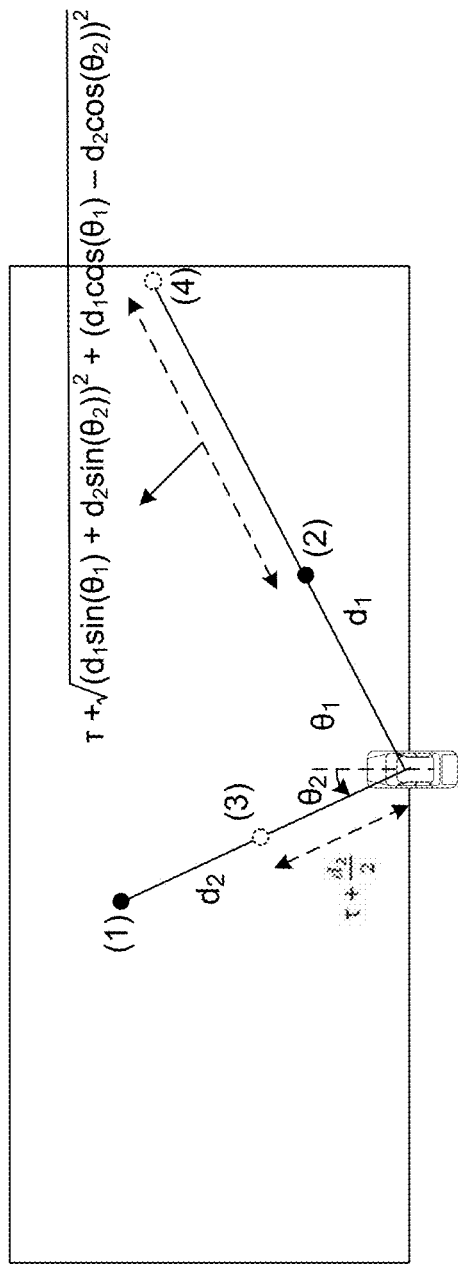

FIG. 8 is a diagram illustrating an example 800 associated with target detection using multiple radar waveforms, in accordance with the present disclosure.

As shown in FIG. 8, an ego-radar associated with a first vehicle (or first UE) may detect targets using reflections from ego-radar transmissions, as well as by using coherent/matched detection of direct and reflections of radar signals from a second radar source. The second radar source may be associated with a second vehicle or second UE. The targets detected by the ego-radar may include a first set of targets (represented by the solid circles), which may be detected based at least in part on reflections of ego-radar signal transmissions. The first set of targets may include, for example, the second vehicle and a pedestrian. The first set of targets may correspond to actual or true targets. The targets detected by the ego-radar may include a second set of targets (represented by the clear circles), which may be detected based at least in part on signal transmissions from the second radar source and coherent reception of the signal transmissions from the second radar source.

As shown in FIG. 8, a direct path of a first target (1) in the first set of targets may be observed at $(\theta_2, d_2/2+\tau)$, which may represent a distance between a first target (3) in the second set of targets and the ego-radar. A reflection of a second target (2) in the first set of targets (e.g., the pedestrian) may be observed at a second target (4) in the second set of targets. The reflection may be observed at $(\theta_1, f(d_1, d_2, \theta_1, \theta_2))$, where $f(d_1, d_2, \theta_1, \theta_2)$ may be represented by:

$$\tau + \sqrt{(d_1\sin(\theta_1) + d_2\sin(\theta_2))^2 + (d_1\cos(\theta_1) - d_2\cos(\theta_2))^2},$$

which may represent a distance between the second target (2) in the first set of targets and the second target (4) in the second set of targets.

In some aspects, the ego-radar may detect direct radar signals and reflections of radar signals from the second radar source when coherent/matched detection is performable at the ego-radar. In other words, the ego-radar may detect the second set of targets (represented by the clear circles) when coherent/matched detection is performable at the ego-radar. In order to perform the coherent/matched detection, the ego-radar may have information regarding radar waveform parameters used by the second radar source.

In some aspects, the ego-radar and the second radar source may communicate the radar waveform parameters via a sidelink communication channel, such as a cellular vehicle-to-everything (C-V2X) channel. In some aspects, the ego-radar may detect or infer the radar waveform parameters without an explicit communication from the second radar source.

In some aspects, the ego-radar and a second radar associated with the second radar source may use different waveform signatures to allow the ego-radar to distinguish between the first set of targets and the second set of targets. For example, the ego-radar and the second radar may employ phase-modulated continuous wave (PMCW) with different codes. As another example, the ego-radar and the second radar may employ FMCW with different parameters, such as time offsets, and/or phase codes.

In some aspects, based at least in part on stored information regarding the radar waveform parameters of the second radar source, the ego-radar may perform coherent/matched detection, such that the ego-radar may observe the second set of targets at location(s) corresponding to direct and reflected paths of the radar signal transmissions from the second radar source.

As indicated above, FIG. 8 is provided as an example. Other examples may differ from what is described with regard to FIG. 8.

Figure 9:
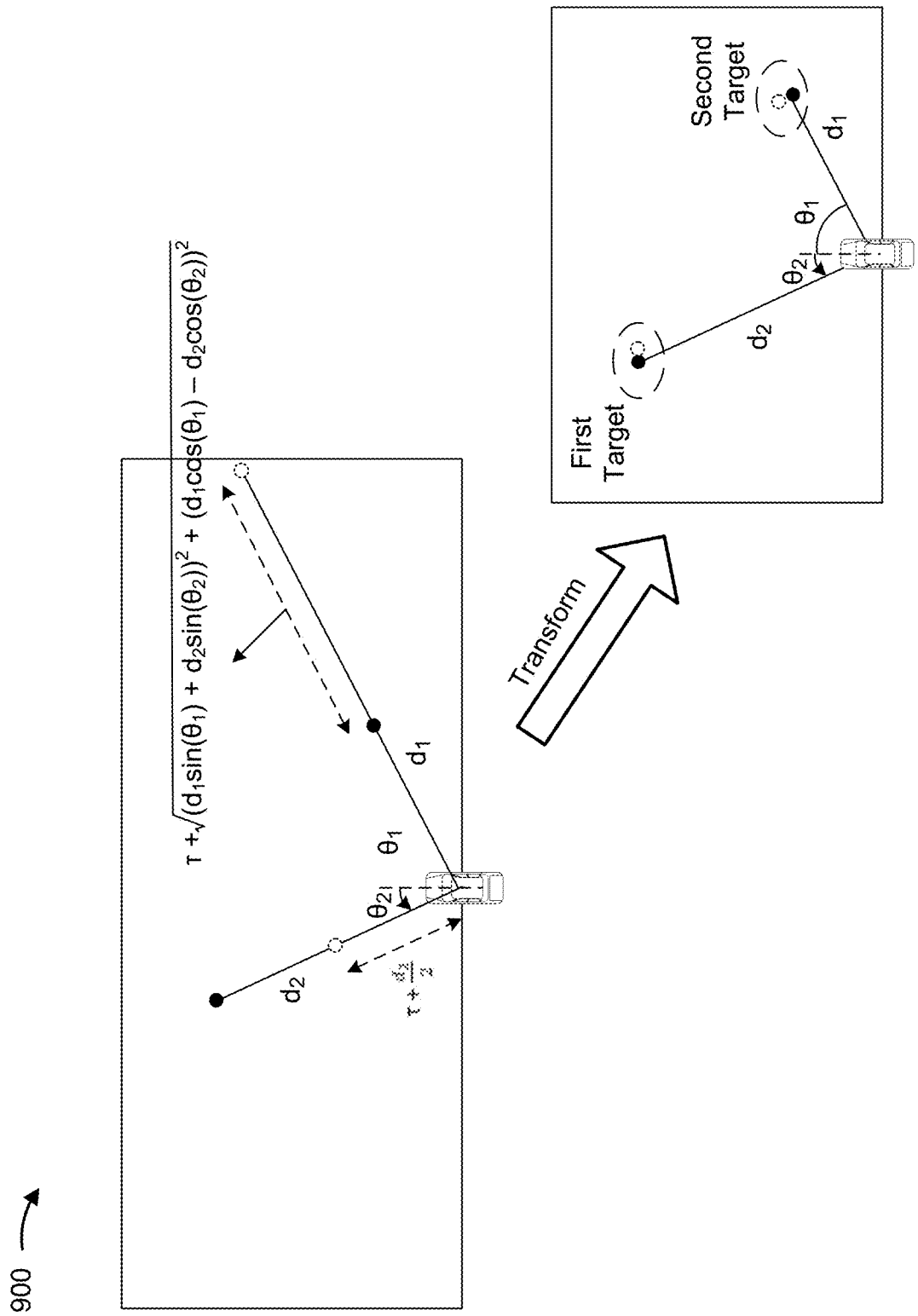

FIG. 9 is a diagram illustrating an example 900 associated with target detection using multiple radar waveforms, in accordance with the present disclosure.

As shown in FIG. 9, an ego-radar associated with a first vehicle (or first UE) may detect a first set of targets (represented by the solid circles) and a second set of targets (represented by the clear circles). The ego-radar may geometrically relate or associate location(s) of the second set of targets and the first set of targets. The first set of targets may correspond to actual or true targets. The second set of targets may be transformed to be placed on the first set of targets. As a result, the ego-radar may detect a first target and a second target.

In some aspects, the first set of targets and the second set of targets may be shown as single points, but may actually correspond to point-clouds. For example, a point-cloud associated with the second set of targets may be transformed to be added to a point-cloud associated with the first set of targets, which may be performed for each target thereby improving target identification and classification.

As indicated above, FIG. 9 is provided as an example. Other examples may differ from what is described with regard to FIG. 9.

Figure 10:
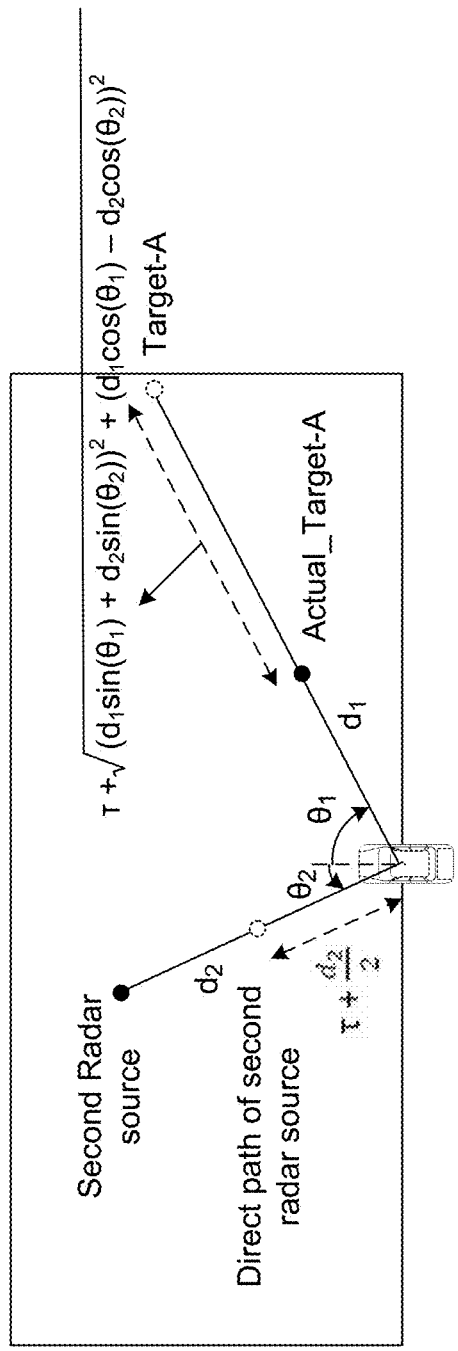

FIG. 10 is a diagram illustrating an example 1000 associated with target detection using multiple radar waveforms, in accordance with the present disclosure.

As shown in FIG. 10, an ego-radar associated with a first vehicle (or first UE) may detect a first set of targets (represented by the solid circles) and a second set of targets (represented by the clear circles). The ego-radar may detect the first set of targets based at least in part on reflections of radar waveforms transmitted by the ego-radar. The ego-radar may detect the second set of targets based at least in part on direct and/or reflections of radar waveforms transmitted by a second radar source. In some aspects, for each target in the second set of targets, the ego-radar may determine whether a target corresponds to a target in the first set of targets (Actual-Target-A, which may be a pedestrian). The ego-radar may determine whether a target corresponds to a target in the first set of targets (Actual-Target-A) based at least in part on a location of the second radar source and the target in the first set of targets (Actual-Target-A). The ego-radar may identify a corresponding target (target-A) by associating the target (target-A) to the target in the first set of targets (Actual-Target-A).

In the example shown in FIG. 10, the second radar source and the Actual-Target-A may each be associated with a direction of arrival (DOA) and a distance. For example, the second radar source may be associated with a (DOA, Distance) of $(\theta_2, d_2)$, and the Actual-Target-A may be associated with a (DOA, Distance) of $(O_r, d_1)$. A direct path from the second radar source may appear as a target in the second set of targets at a (DOA, Distance) of $$\left(\theta_2, \tau + \frac{d_2}{2}\right).$$

A reflection of a radar waveform of Actual-Target-A (e.g., a pedestrian) may appear as Target-A at a location corresponding to a (DOA, Distance) of:

$$\left(\theta_1, \tau + d_1 + \sqrt{(d_1\sin(\theta_1) + d_2\sin(\theta_2))^2 + (d_1\cos(\theta_1) - d_2\cos(\theta_2))^2}\right).$$

As indicated above, FIG. 10 is provided as an example. Other examples may differ from what is described with regard to FIG. 10.

Figure 11:
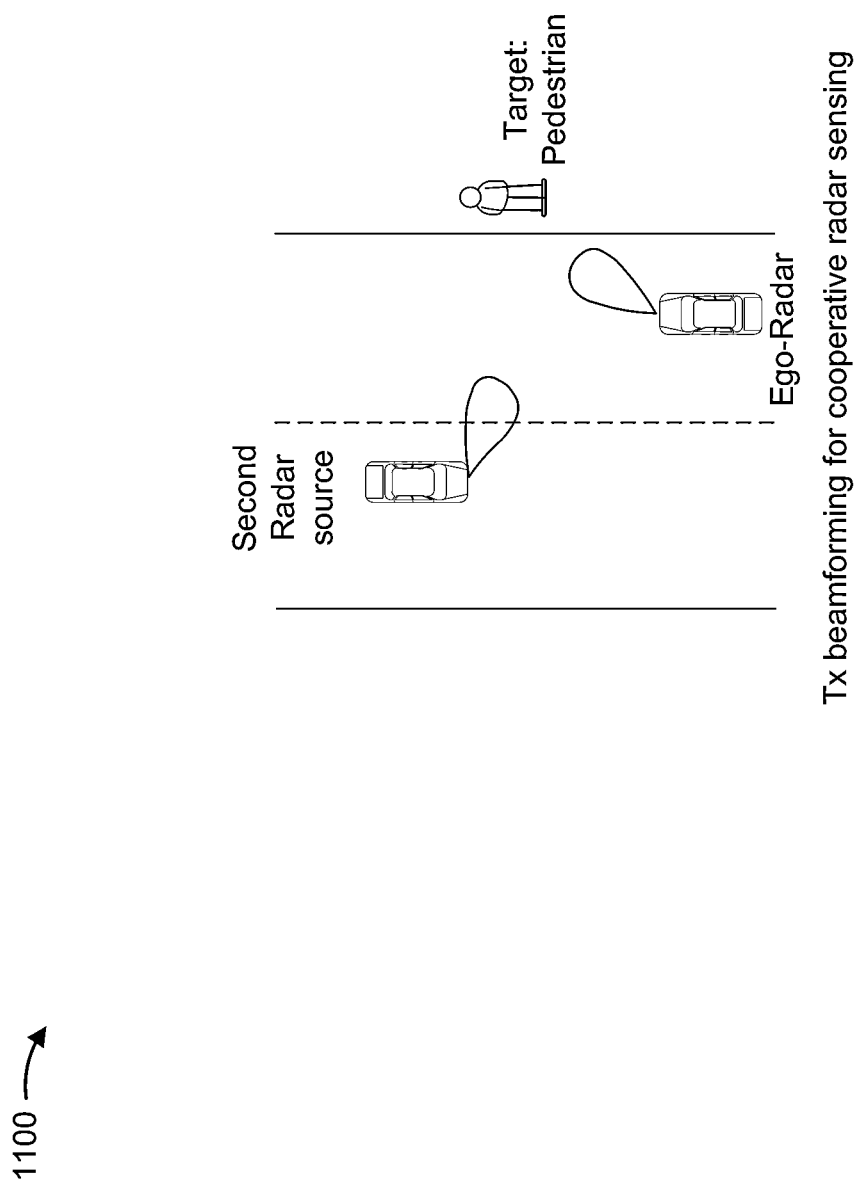

FIG. 11 is a diagram illustrating an example 1100 associated with target detection using multiple radar waveforms, in accordance with the present disclosure.

In some aspects, an ego-radar associated with a first vehicle (or first UE) may be in proximity to a second radar source associated with a second vehicle (or second UE). The second radar source may be an interfering radar source. The ego-radar may request the second radar source to transmit in one or more transmit directions that correspond to one or more targets being detected by the ego-radar. The ego-radar may perform target detection based at least in part on a reception of a first radar waveform and a second radar waveform, where the first radar waveform may be associated with the ego-radar and the second radar waveform may be associated with the second radar source. Further, based at least in part on the request sent by the ego-radar, the first and second radar waveforms may be based at least in part on transmit beamforming towards the target.

As indicated above, FIG. 11 is provided as an example. Other examples may differ from what is described with regard to FIG. 11.

Figure 12:
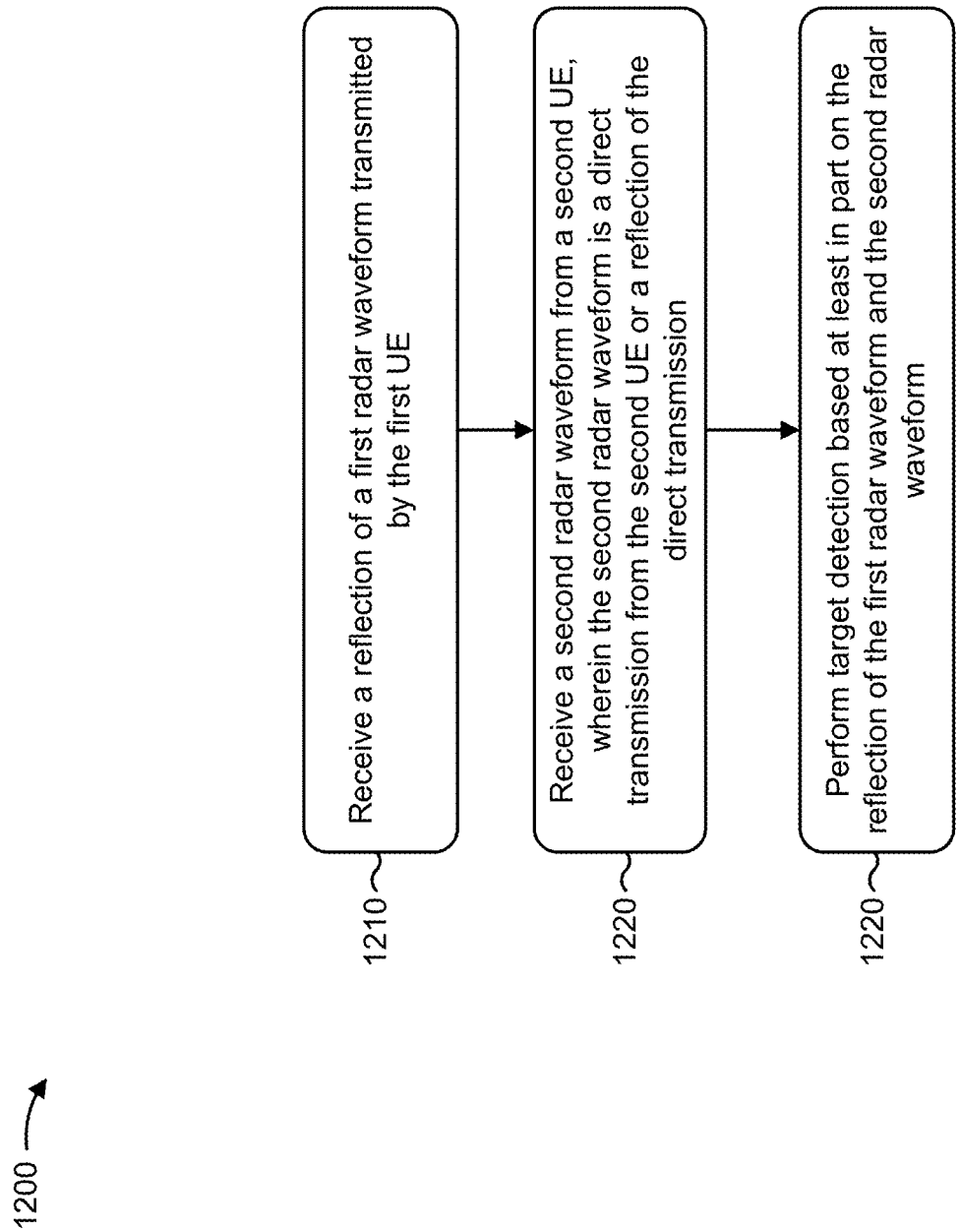
FIG. 12 is a diagram illustrating an example process associated with target detection using multiple radar waveforms, in accordance with the present disclosure.

FIG. 12 is a diagram illustrating an example process 1200 performed, for example, by a first UE, in accordance with the present disclosure. Example process 1200 is an example where the first UE (e.g., UE 102) performs operations associated with target detection using multiple radar waveforms.

As shown in FIG. 12, in some aspects, process 1200 may include receiving a reflection of a first radar waveform transmitted by the first UE (block 1210). For example, the first UE (e.g., using antenna 252, demodulator 254, MIMO detector 256, receive processor 258, controller/processor 280, and/or memory 282) may receive a reflection of a first radar waveform transmitted by the first UE, as described above.

As further shown in FIG. 12, in some aspects, process 1200 may include receiving a second radar waveform from a second UE, wherein the second radar waveform is a direct transmission from the second UE or a reflection of the direct transmission (block 1220). For example, the first UE (e.g., using antenna 252, demodulator 254, MIMO detector 256, receive processor 258, controller/processor 280, and/or memory 282) may receive a second radar waveform from a second UE, wherein the second radar waveform is a direct transmission from the second UE or a reflection of the direct transmission, as described above.

As further shown in FIG. 12, in some aspects, process 1200 may include performing target detection based at least in part on the reflection of the first radar waveform and on the second radar waveform (block 1230). For example, the first UE (e.g., using antenna 252, demodulator 254, MIMO detector 256, receive processor 258, transmit processor 264, TX MIMO processor 266, modulator 254, controller/processor 280, and/or memory 282) may perform target detection based at least in part on the reflection of the first radar waveform and on the second radar waveform, as described above.

Process 1200 may include additional aspects, such as any single aspect or any combination of aspects described below and/or in connection with one or more other processes described elsewhere herein.

In a first aspect, receiving the second radar waveform comprises identifying one or more radar waveform parameters used by the second UE, and receiving the second radar waveform via a matched reception based at least in part on the one or more radar waveform parameters.

In a second aspect, alone or in combination with the first aspect, identifying the one or more radar waveform parameters comprises receiving, from the second UE, the one or more radar waveform parameters via a sidelink interface between the first UE and the second UE.

In a third aspect, alone or in combination with one or more of the first and second aspects, identifying the one or more radar waveform parameters comprises adjusting candidate radar waveform parameters to arrive at the one or more radar waveform parameters when the second radar waveform transmitted by the second UE is detected at the first UE.

In a fourth aspect, alone or in combination with one or more of the first through third aspects, the first radar waveform is not transmitted while the candidate radar waveform parameters are being adjusted to detect the second radar waveform.

In a fifth aspect, alone or in combination with one or more of the first through fourth aspects, identifying the one or more radar waveform parameters comprises adjusting one or more radar waveform parameters associated with the first radar waveform to arrive at the one or more radar waveform parameters used by the second UE when the second radar waveform transmitted by the second UE is detected at the first UE.

In a sixth aspect, alone or in combination with one or more of the first through fifth aspects, the one or more radar waveform parameters associated with the first radar waveform are adjusted to receive the first radar waveform and the second radar waveform.

In a seventh aspect, alone or in combination with one or more of the first through sixth aspects, the first radar waveform is associated with a first waveform signature and the second radar waveform is associated with a second waveform signature.

In an eighth aspect, alone or in combination with one or more of the first through seventh aspects, the first waveform signature is associated with a first code, a first time offset, a first phase code, or a combination thereof.

In a ninth aspect, alone or in combination with one or more of the first through eighth aspects, the second waveform signature is associated with a second code, a second time offset, a second phase code, or a combination thereof.

In a tenth aspect, alone or in combination with one or more of the first through ninth aspects, performing the target detection comprises detecting a first set of targets based at least in part on the reflection of the first radar waveform transmitted by the first UE, and detecting a second set of targets based at least in part on the second radar waveform received from the second UE, wherein the second set of targets are detected based at least in part on the direct transmission of the second radar waveform from the second UE or the reflection of the second radar waveform.

In an eleventh aspect, alone or in combination with one or more of the first through tenth aspects, performing the target detection comprises associating a member of the second set of targets with a member of the first set of targets based at least in part on a location associated with the member of the second set of targets, wherein the member of the second set of targets is associated with the member of the first set of targets to form a detected target.

In a twelfth aspect, alone or in combination with one or more of the first through eleventh aspects, the first set of targets is distinguished from the second set of targets based at least in part on a first waveform signature associated with the first radar waveform and a second waveform signature associated with the second radar waveform.

In a thirteenth aspect, alone or in combination with one or more of the first through twelfth aspects, detecting the target comprises randomizing one or more radar waveform parameters associated with the first radar waveform to distinguish between the first set of targets and the second set of targets.

In a fourteenth aspect, alone or in combination with one or more of the first through thirteenth aspects, process 1200 includes transmitting, to the second UE, a request for the second UE to transmit the second radar waveform in one or more transmit directions.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
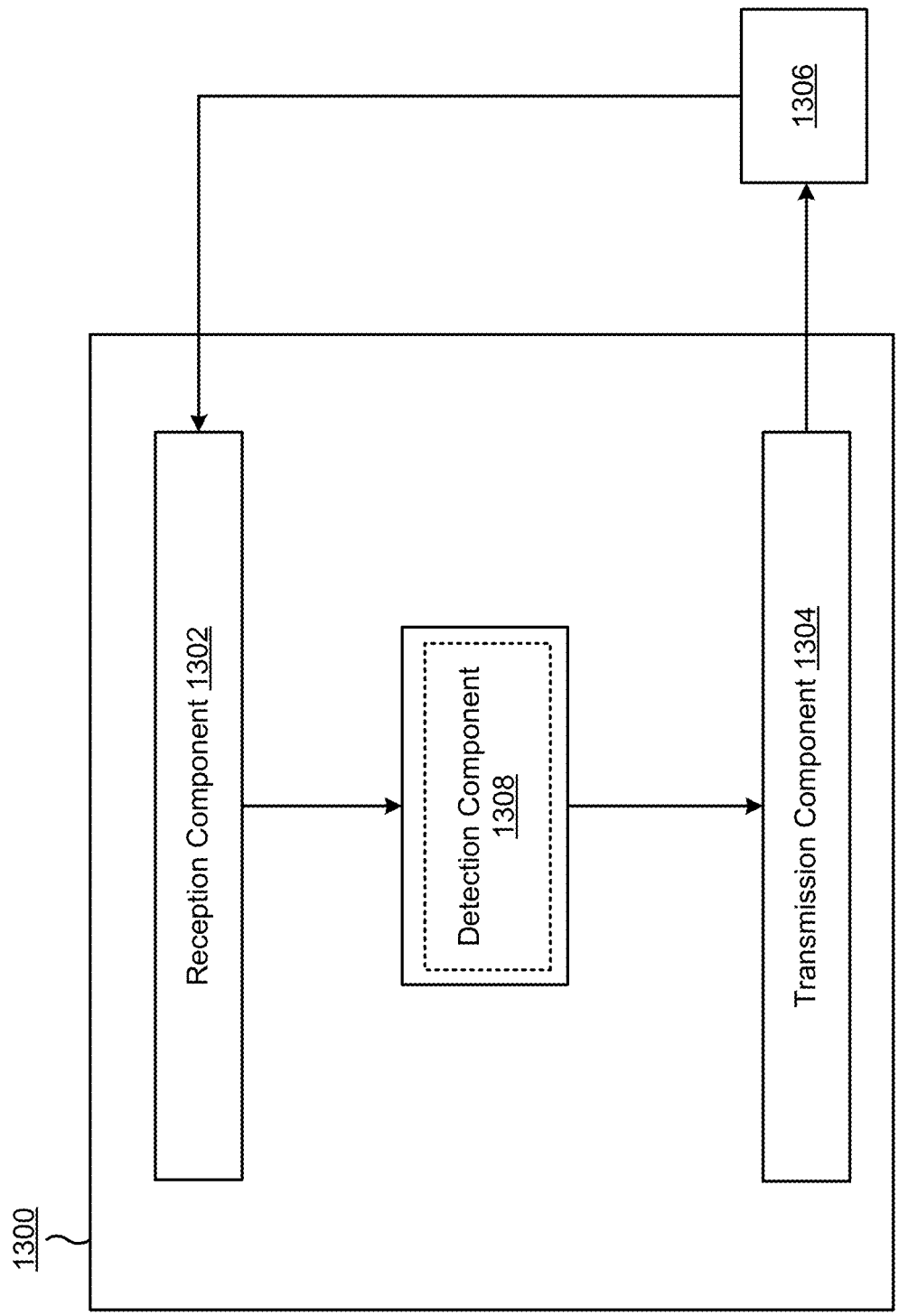
FIG. 13 is a block diagram of an example apparatus for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a detection component 1308, among other examples.

In some aspects, the apparatus 1300 may be configured to perform one or more operations described herein in connection with FIGS. 5-11. Additionally or alternatively, the apparatus 1300 may be configured to perform one or more processes described herein, such as process 1200 of FIG. 12. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive a reflection of a first radar waveform transmitted by the first UE. The reception component 1302 may receive a second radar waveform from a second UE, wherein the second radar waveform is a direct transmission from the second UE or a reflection of the direct transmission. The reception component 1302 may identify one or more radar waveform parameters used by the second UE, and receive the second radar waveform via a matched reception based at least in part on the one or more radar waveform parameters. The reception component 1302 may receive, from the second UE, the one or more radar waveform parameters via a sidelink interface between the first UE and the second UE. The reception component 1302 may adjust candidate radar waveform parameters to arrive at the one or more radar waveform parameters when the second radar waveform transmitted by the second UE is detected at the first UE. The reception component 1302 may adjust one or more radar waveform parameters associated with the first radar waveform to arrive at the one or more radar waveform parameters used by the second UE when the second radar waveform transmitted by the second UE is detected at the first UE.

The detection component 1308 may perform target detection based at least in part on the reflection of the first radar waveform and on the second radar waveform. The detection component 1308 may detect a first set of targets based at least in part on the reflection of the first radar waveform transmitted by the first UE; and detect a second set of targets based at least in part on the second radar waveform received from the second UE, wherein the second set of targets are detected based at least in part on the direct transmission of the second radar waveform from the second UE or the reflection of the second radar waveform. The detection component 1308 may associate a member of the second set of targets with a member of the first set of targets based at least in part on a location associated with the member of the second set of targets, wherein the member of the second set of targets is associated with the member of the first set of targets to form a detected target. The detection component 1308 may randomize one or more radar waveform parameters associated with the first radar waveform to distinguish between the first set of targets and the second set of targets.

In some aspects, the detection component 1308 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The transmission component 1304 may transmit, to the second UE, a request for the second UE to transmit the second radar waveform in one or more transmit directions.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a first user equipment (UE), comprising: receiving a reflection of a first radar waveform transmitted by the first UE; receiving a second radar waveform from a second UE, wherein the second radar waveform is a direct transmission from the second UE or a reflection of the direct transmission; and performing target detection based at least in part on the reflection of the first radar waveform and the second radar waveform.

Aspect 2: The method of Aspect 1, wherein receiving the second radar waveform comprises: identifying one or more radar waveform parameters used by the second UE; and receiving the second radar waveform via a matched reception based at least in part on the one or more radar waveform parameters.

Aspect 3: The method of Aspect 2, wherein identifying the one or more radar waveform parameters comprises: receiving, from the second UE, the one or more radar waveform parameters via a sidelink interface between the first UE and the second UE.

Aspect 4: The method of Aspect 2, wherein identifying the one or more radar waveform parameters comprises: adjusting candidate radar waveform parameters to arrive at the one or more radar waveform parameters when the second radar waveform transmitted by the second UE is detected at the first UE, wherein the first radar waveform is not transmitted while the candidate radar waveform parameters are being adjusted to detect the second radar waveform.

Aspect 5: The method of Aspect 2, wherein identifying the one or more radar waveform parameters comprises: adjusting one or more radar waveform parameters associated with the first radar waveform to arrive at the one or more radar waveform parameters used by the second UE when the second radar waveform transmitted by the second UE is detected at the first UE, wherein the one or more radar waveform parameters associated with the first radar waveform are adjusted to receive the first radar waveform and the second radar waveform.

Aspect 6: The method of any of Aspects 1 through 5, wherein the first radar waveform is associated with a first waveform signature and the second radar waveform is associated with a second waveform signature, wherein the first waveform signature is associated with a first code, a first time offset, a first phase code, or a combination thereof, and wherein the second waveform signature is associated with a second code, a second time offset, a second phase code, or a combination thereof.

Aspect 7: The method of any of Aspects 1 through 6, wherein performing the target detection comprises: detecting a first set of targets based at least in part on the reflection of the first radar waveform transmitted by the first UE; and detecting a second set of targets based at least in part on the second radar waveform received from the second UE, wherein the second set of targets are detected based at least in part on the direct transmission of the second radar waveform from the second UE or the reflection of the second radar waveform.

Aspect 8: The method of Aspect 7, wherein performing the target detection comprises: associating a member of the second set of targets with a member of the first set of targets based at least in part on a location associated with the member of the second set of targets, wherein the member of the second set of targets is associated with the member of the first set of targets to form a detected target.

Aspect 9: The method of Aspect 7, wherein the first set of targets is distinguished from the second set of targets based at least in part on a first waveform signature associated with the first radar waveform and a second waveform signature associated with the second radar waveform.

Aspect 10: The method of Aspect 7, wherein performing the target detection comprises: randomizing one or more radar waveform parameters associated with the first radar waveform to distinguish between the first set of targets and the second set of targets.

Aspect 11: The method of any of Aspects 1 through 10, further comprising: transmitting, to the second UE, a request for the second UE to transmit the second radar waveform in one or more transmit directions.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving a reflection of a first radar waveform transmitted by the first UE;
   transmitting, to a second UE, a request for the second UE to transmit a second radar waveform in one or more transmit directions;
   receiving at least one second radar waveform from the second UE, wherein the at least one second radar waveform includes a direct transmission from the second UE and a reflection of the direct transmission; and
   performing target detection based at least in part on the reflection of the first radar waveform and the at least one second radar waveform.

2. The method of claim 1, wherein receiving the at least one second radar waveform comprises:
   identifying one or more radar waveform parameters used by the second UE; and
   receiving the at least one second radar waveform via a matched reception based at least in part on the one or more radar waveform parameters.

3. The method of claim 2, wherein identifying the one or more radar waveform parameters comprises:
   receiving, from the second UE, the one or more radar waveform parameters via a sidelink interface between the first UE and the second UE.

4. The method of claim 2, wherein identifying the one or more radar waveform parameters comprises:
   adjusting candidate radar waveform parameters to arrive at the one or more radar waveform parameters when the at least one second radar waveform transmitted by the second UE is detected at the first UE, wherein the first radar waveform is not transmitted while the candidate radar waveform parameters are being adjusted to detect the at least one second radar waveform.

5. The method of claim 2, wherein identifying the one or more radar waveform parameters comprises:
   adjusting one or more radar waveform parameters associated with the first radar waveform to arrive at the one or more radar waveform parameters used by the second UE when the at least one second radar waveform transmitted by the second UE is detected at the first UE, wherein the one or more radar waveform parameters associated with the first radar waveform are adjusted to receive the first radar waveform and the at least one second radar waveform.

6. The method of claim 1, wherein the first radar waveform is associated with a first waveform signature and the at least one second radar waveform is associated with a second waveform signature, wherein the first waveform signature is associated with a first code, a first time offset, a first phase code, or a combination thereof, and wherein the second waveform signature is associated with a second code, a second time offset, a second phase code, or a combination thereof.

7. The method of claim 1, wherein performing the target detection comprises:
   detecting a first set of targets based at least in part on the reflection of the first radar waveform transmitted by the first UE; and
   detecting a second set of targets based at least in part on the at least one second radar waveform received from the second UE, wherein the second set of targets are detected based at least in part on the direct transmission of the at least one second radar waveform from the second UE or the reflection of the at least one second radar waveform.

8. The method of claim 7, wherein performing the target detection comprises:
   associating a member of the second set of targets with a member of the first set of targets based at least in part on a location associated with the member of the second set of targets, wherein the member of the second set of targets is associated with the member of the first set of targets to form a detected target.

9. The method of claim 7, wherein the first set of targets is distinguished from the second set of targets based at least in part on a first waveform signature associated with the first radar waveform and a second waveform signature associated with the at least one second radar waveform.

10. The method of claim 7, wherein performing the target detection comprises:
   randomizing one or more radar waveform parameters associated with the first radar waveform to distinguish between the first set of targets and the second set of targets.

11. A first user equipment (UE) for wireless communication, comprising:
   one or more memories; and
   one or more processors, coupled to the one or more memories, configured to:
      receive a reflection of a first radar waveform transmitted by the first UE;
      transmit, to a second UE, a request for the second UE to transmit a second radar waveform in one or more transmit directions;
      receive at least one second radar waveform from the second UE, wherein the at least one second radar waveform includes a direct transmission from the second UE and a reflection of the direct transmission; and perform target detection based at least in part on the reflection of the first radar waveform and the at least one second radar waveform.

12. The first UE of claim 11, wherein the one or more processors, to receive the at least one second radar waveform, are configured to:
identify one or more radar waveform parameters used by the second UE; and
receive the at least one second radar waveform via a matched reception based at least in part on the one or more radar waveform parameters.

13. The first UE of claim 12, wherein the one or more processors, to identify the one or more radar waveform parameters, are configured to:
receive, from the second UE, the one or more radar waveform parameters via a sidelink interface between the first UE and the second UE.

14. The first UE of claim 12, wherein the one or more processors, to identify the one or more radar waveform parameters, are configured to:
adjust candidate radar waveform parameters to arrive at the one or more radar waveform parameters when the at least one second radar waveform transmitted by the second UE is detected at the first UE, wherein the first radar waveform is not transmitted while the candidate radar waveform parameters are being adjusted to detect the at least one second radar waveform.

15. The first UE of claim 12, wherein the one or more processors, to identify the one or more radar waveform parameters, are configured to:
adjust one or more radar waveform parameters associated with the first radar waveform to arrive at the one or more radar waveform parameters used by the second UE when the at least one second radar waveform transmitted by the second UE is detected at the first UE, wherein the one or more radar waveform parameters associated with the first radar waveform are adjusted to receive the first radar waveform and the at least one second radar waveform.

16. The first UE of claim 11, wherein the first radar waveform is associated with a first waveform signature and the at least one second radar waveform is associated with a second waveform signature, wherein the first waveform signature is associated with a first code, a first time offset, a first phase code, or a combination thereof, and wherein the second waveform signature is associated with a second code, a second time offset, a second phase code, or a combination thereof.

17. The first UE of claim 11, wherein the one or more processors, to perform the target detection, are configured to:
detect a first set of targets based at least in part on the reflection of the first radar waveform transmitted by the first UE; and
detect a second set of targets based at least in part on the at least one second radar waveform received from the second UE, wherein the second set of targets are detected based at least in part on the direct transmission of the at least one second radar waveform from the second UE or the reflection of the at least one second radar waveform.

18. The first UE of claim 17, wherein the one or more processors, to perform the target detection, are configured to:
associate a member of the second set of targets with a member of the first set of targets based at least in part on a location associated with the member of the second set of targets, wherein the member of the second set of targets is associated with the member of the first set of targets to form a detected target.

19. The first UE of claim 17, wherein the first set of targets is distinguished from the second set of targets based at least in part on a first waveform signature associated with the first radar waveform and a second waveform signature associated with the at least one second radar waveform.

20. The first UE of claim 17, wherein the one or more processors, to perform the target detection, are configured to:
randomize one or more radar waveform parameters associated with the first radar waveform to distinguish between the first set of targets and the second set of targets.

21. A non-transitory computer-readable medium storing a set of instructions for wireless communication, the set of instructions comprising:
one or more instructions that, when executed by one or more processors of a first user equipment (UE), cause the first UE to:
receive a reflection of a first radar waveform transmitted by the first UE;
transmit, to a second UE, a request for a second UE to transmit a second radar waveform in one or more transmit directions;
receive at least one second radar waveform from the second UE, wherein the at least one second radar waveform includes a direct transmission from the second UE and a reflection of the direct transmission; and
perform target detection based at least in part on the reflection of the first radar waveform and the at least one second radar waveform.

22. The non-transitory computer-readable medium of claim 21, wherein the one or more instructions, that cause the first UE to receive the at least one second radar waveform, cause the first UE to:
identify one or more radar waveform parameters used by the second UE; and
receive the at least one second radar waveform via a matched reception based at least in part on the one or more radar waveform parameters.

23. The non-transitory computer-readable medium of claim 21, wherein the first radar waveform is associated with a first waveform signature and the at least one second radar waveform is associated with a second waveform signature, wherein the first waveform signature is associated with a first code, a first time offset, a first phase code, or a combination thereof, and wherein the second waveform signature is associated with a second code, a second time offset, a second phase code, or a combination thereof.

24. The non-transitory computer-readable medium of claim 21, wherein the one or more instructions, that cause the first UE to perform the target detection, cause the first UE to:
detect a first set of targets based at least in part on the reflection of the first radar waveform transmitted by the first UE; and
detect a second set of targets based at least in part on the at least one second radar waveform received from the second UE, wherein the second set of targets are detected based at least in part on the direct transmission of the at least one second radar waveform from the second UE or the reflection of the at least one second radar waveform.

25. The non-transitory computer-readable medium of claim 22, wherein the one or more instructions, that cause the first UE to identify the one or more radar waveform parameters, cause the first UE to:
receive, from the second UE, the one or more radar waveform parameters via a sidelink interface between the first UE and the second UE.

26. A first apparatus for wireless communication, comprising:
means for receiving a reflection of a first radar waveform transmitted by the first apparatus;
means for transmitting, to a second apparatus, a request for the second apparatus to transmit a second radar waveform in one or more transmit directions;
means for receiving at least one second radar waveform from a second apparatus, wherein the at least one second radar waveform includes a direct transmission from the second apparatus and a reflection of the direct transmission; and
means for performing target detection based at least in part on the reflection of the first radar waveform and the at least one second radar waveform.

27. The first apparatus of claim 26, wherein the means for receiving the at least one second radar waveform comprises:
means for identifying one or more radar waveform parameters used by the second apparatus; and
means for receiving the at least one second radar waveform via a matched reception based at least in part on the one or more radar waveform parameters.

28. The first apparatus of claim 26, wherein the first radar waveform is associated with a first waveform signature and the at least one second radar waveform is associated with a second waveform signature, wherein the first waveform signature is associated with a first code, a first time offset, a first phase code, or a combination thereof, and wherein the second waveform signature is associated with a second code, a second time offset, a second phase code, or a combination thereof.

29. The first apparatus of claim 26, wherein the means for performing target detection comprises:
means for detecting a first set of targets based at least in part on the reflection of the first radar waveform transmitted by the first apparatus; and
means for detecting a second set of targets based at least in part on the at least one second radar waveform received from the second apparatus, wherein the second set of targets are detected based at least in part on the direct transmission of the at least one second radar waveform from the second apparatus or the reflection of the at least one second radar waveform.

30. The first apparatus of claim 26, wherein the means for transmitting the request to the second apparatus comprises means for transmitting the request via a sidelink interface between the first apparatus and the second apparatus.

* * * * *